US007580060B2

(12) United States Patent
Kuroiwa (10) Patent No.: US 7,580,060 B2
(45) Date of Patent: Aug. 25, 2009

(54) ELECTRONIC CAMERA THAT REDUCES PROCESSING TIME BY PERFORMING DIFFERENT PROCESSES IN PARALLEL

(75) Inventor: Toshihisa Kuroiwa, Miura (JP)

(73) Assignee: Nikon Corporation, Tokyo (JP)

( * ) Notice: Subject to any disclaimer, the term of this patent is extended or adjusted under 35 U.S.C. 154(b) by 438 days.

(21) Appl. No.: 11/333,243

(22) Filed: Jan. 18, 2006

(65) Prior Publication Data

US 2006/0114330 A1   Jun. 1, 2006

Related U.S. Application Data

(62) Division of application No. 09/505,281, filed on Feb. 16, 2000, now abandoned.

(30) Foreign Application Priority Data

Sep. 28, 1999   (JP) ................................. 11-275232
Nov. 25, 1999   (JP) ................................. 11-334586

(51) Int. Cl.
    *H04N 5/228*   (2006.01)
(52) U.S. Cl. ................................................. 348/222.1
(58) Field of Classification Search ............... 348/222.1
    See application file for complete search history.

(56) References Cited

U.S. PATENT DOCUMENTS

| 5,933,137 A | * | 8/1999 | Anderson ..................... 715/720 |
| 6,515,704 B1 | | 2/2003 | Sato |
| 6,542,192 B2 | * | 4/2003 | Akiyama et al. ........ 348/333.11 |
| 7,113,208 B1 | * | 9/2006 | Saga ........................ 348/231.99 |
| 2003/0122950 A1 | | 7/2003 | Anderson |

FOREIGN PATENT DOCUMENTS

JP   02304486 A   12/1990

* cited by examiner

*Primary Examiner*—James M Hannett
(74) *Attorney, Agent, or Firm*—Oliff & Berridge, PLC (57) ABSTRACT

An electronic camera includes: an image-capturing device that captures an image of a subject and generates image data; a first bus to which the image data generated by the image capturing device are output; an image memory that is connected to the first bus and temporarily stores the image data on the first bus; a plurality of image data conversion devices connected to the first bus that individually convert the image data on the first bus; a second bus through which conversion outputs from the plurality of image data conversion devices are provided to individual output destinations; and an adjustment device that performs timing adjustment or multiplexing of a plurality of conversion outputs to ensure that the plurality of conversion outputs do not collide on the second bus.

8 Claims, 7 Drawing Sheets

PIXEL BLOCK REFERENCED FOR COLOR INTERPOLATION

FIG. 3B

PIXEL BLOCK NECESSARY FOR COMPRESSING IMAGE DATA FOR SINGLE COLOR COMPONENT

FIG. 3C

PIXEL BLOCK NECESSARY FOR 4:4:4 COMPRESSION

FIG. 3D
PIXEL BLOCK NECESSARY FOR 4:2:2 COMPRESSION

FIG. 3E
PIXEL BLOCK NECESSARY FOR 4:2:0 COMPRESSION

FIG. 6 PRIOR ART

ELECTRONIC CAMERA THAT REDUCES PROCESSING TIME BY PERFORMING DIFFERENT PROCESSES IN PARALLEL

This application is a Divisional of U.S. patent application Ser. No. 09/505,281 filed on Feb. 16, 2000, which is hereby incorporated by reference in its entirety. This application claims priority to Japanese Patent Application No. 11-275232, filed Sep. 28, 1999 and Japanese Patent Application No. 11-334586, filed Nov. 25, 1999.

BACKGROUND OF THE INVENTION

1. Field of the Invention

The present invention relates to a technology that my be adopted to reduce the required length of processing time in an electronic camera 2. Description of the Related Art (Structural Example of Prior Art)

Figure 6:
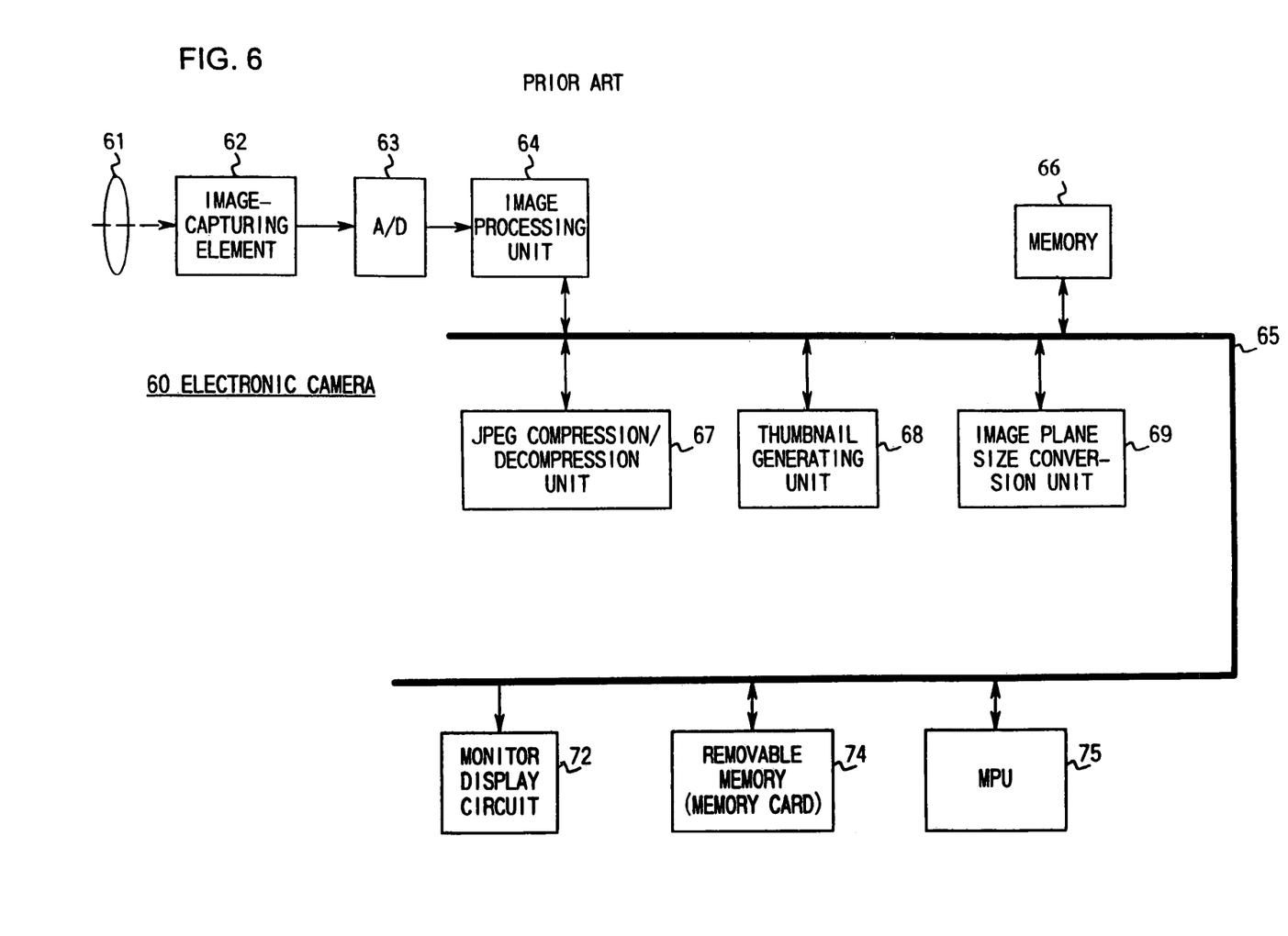
FIG. 6 is a block diagram illustrating the structure of the electronic camera 60 in the prior art.

FIG. 6 is a block diagram illustrating the structure of an electronic camera 60 in the prior art.

In FIG. 6, a taking lens 61 is mounted at the electronic camera 60. An image-capturing element 62 is provided in the image space of the taking lens 61. An image output of the image-capturing element 62 is connected to a bus 65 via an A/D conversion circuit 63 and an image processing unit 64.

In addition, the following components are connected to the bus 65:
1. MPU 75 for system control
2. memory 66 that temporarily stores image data and al-so stores system data managed by the MPU 75
3. JPEG compression/decompression unit 67 that performs impression/decompression of image data
4. thumbnail generating unit 68 that generates thumbnail images
5. image plane (or screen) size conversion unit 69 that generates images for monitor display
6. monitor display circuit 72
7. removable memory 74 for recording image data (Operation Achieved in the Example of the Prior Art)

The following is an explanation of the operation performed in the electronic camera 60.

First, image data obtained through image-capturing performed at the image-capturing element 62 undergo linear quantization via the A/D conversion circuit 63 and then are provided to the image processing unit 64. The image processing unit 64 performs image processing such as defective pixel correction, black level clamping, white balance adjustment, gamma correction, color interpolation processing (two-dimensional image processing under normal circumstances), color space conversion, space filter processing (two-dimensional image processing such as edge emphasis under normal circumstances) and the like on the image data, and the image data having undergone the image processing are temporarily recorded in the memory 66 via the bus 65.

Next, the image plane size conversion unit 69 reads out the image data having undergone image processing by accessing the memory 66 via the bus 65. The image plane size conversion unit 69 reduces the image plane (or screen) size of the image data to the correct size for monitor display and records them in the memory 66 again via the bus 65. The image data having undergone image plane size conversion are again read out from the memory 66 by the monitor display circuit 72 which then displays the image data on the monitor screen.

The thumbnail generating unit 68 accesses the memory 66 via the bus 65 to read out the image data having undergone the image processing. After generating a thumbnail image by reducing the image plane size of the image data, the thumbnail generating unit 68 temporarily records the resulting thumbnail in the memory 66 via the bus 65.

In addition, the JPEG compression/decompression unit 67 reads out the image data having undergone image processing by accessing the memory 66 via the bus 65. The JPEG compression/decompression unit 67 performs a trial compression on the image data and notifies the MPU 75 of the compressed code volume. Based upon a plurality of compressed code volumes provided in this manner, the MPU 75 calculates the correct scale factor (an adjustable parameter that determines the compressed code volume) and issues an instruction to the JPEG compression/decompression unit 67. The JPEG compression/decompression unit 67 reads out the image data having undergone image processing again from the memory 66 via the bus 65 and executes a main compression using the specified scale factor. The compressed data resulting from the main compression are then temporarily recorded in the memory 66 via the bus 65.

Next, the JPEG compression/decompression unit 67 reads out the thumbnail image from the memory 66 via the bus 65 and compresses the thumbnail image. The JPEG compression/decompression unit 67 temporarily records the compressed thumbnail image in the memory 66. Then, the MPU 75 reads out the compressed data from the memory 66 via the bus 65, and generates an image file by combining the compressed data with the compressed thumbnail image. The MPU 75 records this image file in the removable memory 74 via the bus 65.

Through the series of operations described above, image data obtained by capturing images of a subject are sequentially recorded in the removable memory 74.

It is to be noted that while the image plane size conversion, the thumbnail generation and the JPEG compression/decompression are executed by dedicated hardware in the explanation given above, these operations may be achieved through software processing by the MPU 75 if the length of the processing time is not a critical issue.

In this example of the prior art, great volumes of data: are repeatedly exchanged via the bus 65 as described above. For this reason, the timing adjustment implemented to avoid data collisions becomes extremely complicated. Furthermore, if the bus 65 cannot assume a sufficiently wide band, the individual processing operations must be executed sequentially.

Thus, a problem arises in that the processing performed in the electronic camera 60 consumes a great deal of time.

SUMMARY OF THE INVENTION

An object of the present invention is to provide an electronic camera in which the length of processing time can be reduced.

In order to attain the above object, the first, electronic camera according to the present invention comprises: an image-capturing device that captures an image of a subject and generates image data; a first bus to which the image data generated by the image-capturing device are output; an image memory that is connected to the first bus and temporarily stores the image data on the first bus; a plurality of image data conversion devices connected to the first bus that individually convert the image data on the first bus; a second bus through which conversion outputs from the plurality of image data conversion devices are provided to individual output destinations; and an adjustment device that performs timing adjustment or multiplexing of a plurality of conversion outputs to ensure that the plurality of conversion outputs do not collide on the second bus.

In the electronic camera structured described above, the first bus and the second bus are separated from each other with a high degree of reliability by the plurality of image data conversion devices provided between them. As a result, the plurality of image data conversion devices take in pre-conversion image data from the first bus (similar to a water supply pipe as a metaphor) and release converted image data to the second bus (similar to a water drainage system as a metaphor). As a result, the pre-conversion image data and the converted image data do not collide on a single bus, to enable smooth execution of image data conversion processing. Consequently, the length of time required for the processing from image-capturing through recording can be reduced with a high degree of reliability.

The second electronic camera according to the present invention is achieved by that in the first electronic camera the plurality of image data conversion devices are an image processing device that performs two-dimensional image processing on the image data, a compression conversion device that compresses the image data and a size conversion device that converts the image plane size of the image data.

The contents of the individual image data conversions performed at the image processing device, the compression conversion device and the size conversion device above are different from one another and, thus, the individual image data conversions can be executed independently of one another. As a result, in the electronic camera structured as described above, the image data conversions can be executed in parallel by these devices to achieve a further reduction in the length of time required for the processing from image-capturing through recording.

In addition, by providing the image processing device halfway between the first bus and the second bus, it becomes possible to output uncompressed image data that have undergone only two-dimensional image processing directly to the second bus. In such a case, operations to record uncompressed image data at an external device and output the uncompressed image to the outside via the second bus are enabled.

The third electronic camera according to the present invention is achieved by that in the first or the second electric camera at least one of the plurality of image data conversion devices has an output destination setting device that sets the first bus and/or the second bus as an output destination for a conversion output.

For instance, if an output destination setting device is provided at the image processing device, it becomes possible to first return image data having undergone two-dimensional image processing to the first bus and then provide them to the compression conversion device or the size conversion device. In such a case, the two-dimensional image processing and the compression processing or the like can be executed continuously. In particular, the compression conversion device is expected to execute a plurality of compression conversions including trial compressions. To facilitate the execution of a plurality of compression conversions, the image data returned to the first bus may be temporarily stored in an image memory. Since image data can be provided from the image memory to the image compression device in the second compression conversion processing and in subsequent compression conversion processing, an advantage is achieved in that the need for repeatedly executing the image processing by the image processing device is eliminated.

If, on the other hand, an output destination setting device is provided at the size conversion device, image data having undergone size conversion can be first returned to the first bus and then provided to the compression conversion device. In this case, operations to perform compression conversion on image data (e.g., a thumbnail image) having undergone size conversion and the like are enabled.

In addition, if an output destination setting device is provided at the size conversion device, image data having undergone image plane size conversion for monitor display can be output to a monitor display device or the like via the first bus. In such a case, since the monitor display image data are not provided to the second bus, the load on the second bus is greatly reduced. As a result, the heavy processing (e.g., monitor display of dynamic images) implemented via the first bus and the heavy processing (e.g., recording of image files obtained through image-capturing) implemented via the second bus can be separately and smoothly executed in parallel.

If an output destination setting device is provided at the compression conversion device, image data having undergone image compression can be first returned to the first bus and then provided to a device that prepares image files or the like. In this case, operations to create image files by adding pertinent information to the compressed image data and the like are enabled.

By providing an output destination setting device at an image data conversion device and switching the destination of a conversion output between the first bus and the second bus in this manner, various types of signal processing are enabled. In particular, by selectively returning a specific conversion output to the first bus by employing the output destination setting device, the order in which conversion outputs are provided to the second bus can be changed as necessary or the loads on the first bus and the second bus can be adjusted in a flexible manner in correspondence to the processing statuses.

The fourth electronic camera according to the present invention is preferably achieved by that in the first or the second electronic camera a transmission device that directly transmits a conversion output without engaging the first bus or the second bus is provided among, at least, a pair of the plurality of image data conversion devices.

By adopting the structure of the first electronic camera as the basic structural foundation and adding a transmission device among the plurality of image data conversion devices, selection of various signal routes is enabled so that diverse types of signal processing can be achieved. In addition, by providing a transmission device, the loads on the first bus and the second bus can be reduced to realize even smoother processing.

The fifth electronic camera according to the present invention comprises: an image-capturing device that captures an image of a subject and generates image data; an image-capturing preparation device that executes preparation for image-capturing to be performed by the image-capturing device, the preparation being at least one of focus control, photometering and white balance detection; and a recording device that records the image data generated by the image-capturing device in a removable memory. And processing time during an image-capturing preparation stage in the electronic camera is reduced by implementing in parallel the preparation for image-capturing executed by the image-capturing preparation device and an operation to check the removable memory performed by the recording device.

The sixth electronic camera according to the present invention comprises: an image-capturing device that captures an image of a subject and generates image data; an image-capturing preparation device that executes preparation for image-capturing to be performed by the image-capturing device, the preparation being at least one of focus control, photometering and white balance detection; and a recording device that records the image data generated by the image-capturing device in a removable memory. And processing time during an image-capturing stage in the electronic camera is reduced by implementing in parallel at least two of an operation to finalize the preparation for image-capturing by the image-capturing preparation device, an operation to activate the image-capturing device and an operation to activate the recording device, the operation to finalize the preparation being at least one of AF lock, an operation to hold exposure calculation results and an operation to hold white balance calculation results.

The seventh electronic camera according to the present invention comprises: an image-capturing device that captures an image of a subject and generates image data; and a recording device that records the image data generated by the image-capturing device in combination with photographic is information, which is at least one type of information related to photographing such as a photographing date, in a removable memory. And, during an image-capturing stage in the electronic camera, processing time elapsing from image-capturing through recording is reduced by implementing in parallel an image-capturing operation by the image-capturing device and an editing operation of the photographic information performed by the recording device.

The eighth electronic camera according to the present invention comprises: an image-capturing device that captures an image of a subject and generates image data; a recording device that records the image data generated by the image-capturing device in a removable memory. And, during an image-capturing stage in the electronic camera, processing time elapsing from image-capturing through recording is reduced by implementing in parallel an image-capturing operation by the image-capturing device and a preparing operation for data recording in the removable memory performed by the recording device.

The ninth electronic camera according to the present invention comprises: an image-capturing device that captures an image of a subject and generates image data; and an image processing device that performs two-dimensional image processing on the image data generated by the image-capturing device. And, processing time during an image-capturing stage in the electronic camera is reduced by implementing in parallel a scanning read of the image data from the image-capturing device and the two-dimensional image processing performed by the image processing device.

It is to be noted that the image data read out from the image-capturing device through scanning are sequentially recorded in the image memory. During this process, some of the image data that are held on the first bus over a specific length of time before they are written into the image memory may be taken in by the image processing device. Through such an operation, the number of times image data need to be read out from the image memory by the image processing device is reduced, so that the length of time required for the processing performed during the image-capturing stage can be further reduced.

The tenth electronic camera according to the present invention comprises: an image-capturing device that captures an image of a subject and generates image data; an image processing device that performs two-dimensional image processing on the image data generated by the image-capturing device; and a compression conversion device that performs image compression on the image data having undergone two-dimensional image processing at the image processing device. And, processing time during an image-capturing stage in the electronic camera is reduced by implementing in parallel the two-dimensional image processing performed by the image processing device and the image compression by the compression conversion device.

The eleventh electronic camera according to the present invention comprises: an image-capturing device that captures an image of a subject and generates image data; an image processing device that performs two-dimensional image processing on the image data generated by the image-capturing device; and a size conversion device that converts an image plane size of image data having undergone two-dimensional image processing at the image processing device. And, processing time during an image-capturing stage in the electronic camera is reduced by implementing in parallel the two-dimensional image processing performed by the image processing device and an image plane size conversion by the size conversion device.

The twelfth electronic camera according to the present invention is preferably achieved by that in the ninth electronic camera a thumbnail compression device that performs image compression processing on the image data having undergone image plane size conversion performed by the size conversion device is further provided, and processing time during an image-capturing stage in the electronic camera is reduced by implementing in parallel the image plane size conversion performed by the size conversion device and the image compression processing performed by the thumbnail compression device.

The thirteenth electronic camera according to the present invention comprises: an image-capturing device that captures an image of a subject and generates image data; a compression conversion device that performs image compression on the image data generated by the image-capturing device; and a recording device that records compressed data resulting from compression performed by the compression conversion device in a removable memory. And, during an image-capturing stage in the electronic camera, processing time elapsing from image-capturing through recording is reduced by implementing in parallel the image compression performed by the compression conversion device and recording of the compressed data by the recording device.

The fourteenth electronic camera according to the present invention comprises: an image-capturing device that captures an image of a subject and generates image data; a recording device that records the image data resulting from image-capturing by the image-capturing device in a removable memory; a reproduction device that reads out the image data from the removable memory; and an information management device that saves and retrieves management information necessary in an operation to reproduce the image data from the removable memory in response to a power off and on. And, processing time during a reproduction preparation stage is reduced by implementing in parallel an operation to activate the removable memory performed by the reproduction device and retrieving of the management information by the information management device.

The fifteenth electronic camera according to the present invention comprises: an image-capturing device that captures an image of a subject and generates image data; a compression conversion device that performs image compression on the image data resulting from image-capturing by the image-capturing device; a recording device that records compressed data resulting from the image compression by the compression conversion device in a removable memory; a reproduction device that reads out the compressed data from the removable memory; and a decompression conversion device that performs image decompression on the compressed data read out from the removable memory. And, processing time during an image reproduction stage in the electronic camera is reduced by implementing in parallel a read of the compressed data from the removable memory performed by the reproduction device and decompression conversion of compressed data performed by the decompression conversion device.

The sixteenth electronic camera according to the present invention is achieved by that in the fifteenth camera a size conversion device that converts an image plane size of the image data having undergone the decompression conversion performed by the decompression conversion device to an image plane size for monitor display is further provided, and processing time during an image reproduction stage in the electronic camera is reduced by implementing in parallel the decompression conversion of the compressed data performed by the decompression conversion device and image plane size conversion performed by the size conversion device.

The seventeenth electronic camera according to the present invention comprises: an image-capturing device that captures an image of a subject and generates image data; a recording device that records the image data resulting from image-capturing by the image-capturing device in a removable memory; a reproduction device that reads out the image data from the removable memory; and a size conversion device that converts an image plane size of the image data read out by the reproduction device to an image plane size for monitor display. And, processing time during an image reproduction stage in the electronic camera is reduced by implementing in parallel a read of the image data from the removable memory performed by the reproduction device and the image plane size conversion performed by the size conversion device.

The eighteenth electronic camera according to the present invention is achieved by that in either one of the first through the third electronic cameras, at least one of the plurality of image data conversion devices has an input source setting device that sets the first bus and/or the second bus as an input source of image data.

For instance, if an input source setting device is provided at the size conversion device, uncompressed image data read out from the removable memory or the like onto the second bus in the reproduction mode can be directly provided to the size conversion device. In this case, it becomes possible to quickly generate monitor display image data by bypassing any unnecessary routing. In addition, since the image data in the reproduction system hardly ever flow through the first bus, the load on the first bus is greatly reduced.

If, on the other hand, an input source setting device is provided at the compression conversion device, uncompressed image data read out from the removable memory or the like onto the second bus in the reproduction mode can be directly provided to the compression conversion device. In this case, processing such as re-compressing reproduction data can be executed quickly by bypassing any unnecessary routing.

In addition, if an input source setting device is provided at the image processing device, uncompressed image data read out from the removable memory or the like onto the second bus in the reproduction mode can be directly provided to the image processing device. In this case, processing such as two-dimensional image processing performed again on the reproduction data can be executed quickly by bypassing any unnecessary routing.

Furthermore, when image data before undergoing two-dimensional image processing are recorded in the removable memory, for instance, the image data can be directly provided to the image processing device to realize quick reproduction/display at the camera.

By adding an input source setting device at an image data conversion device in this manner, selection of various signal processing routes is enabled.

In particular, if both an input source setting device and an output destination setting device are provided at an image data conversion device, it becomes possible to temporarily reverse the flow of image data, to the flow directed from the second bus to the first bus. In this case, the loads on the two buses can be adjusted in a flexible manner by, for instance, switching the roles of the first bus and the second bus in correspondence to the processing statuses.

DESCRIPTION OF THE PREFERRED EMBODIMENT

The following is an explanation of an embodiment of the present invention, given in reference to the drawings.

Figure 1:
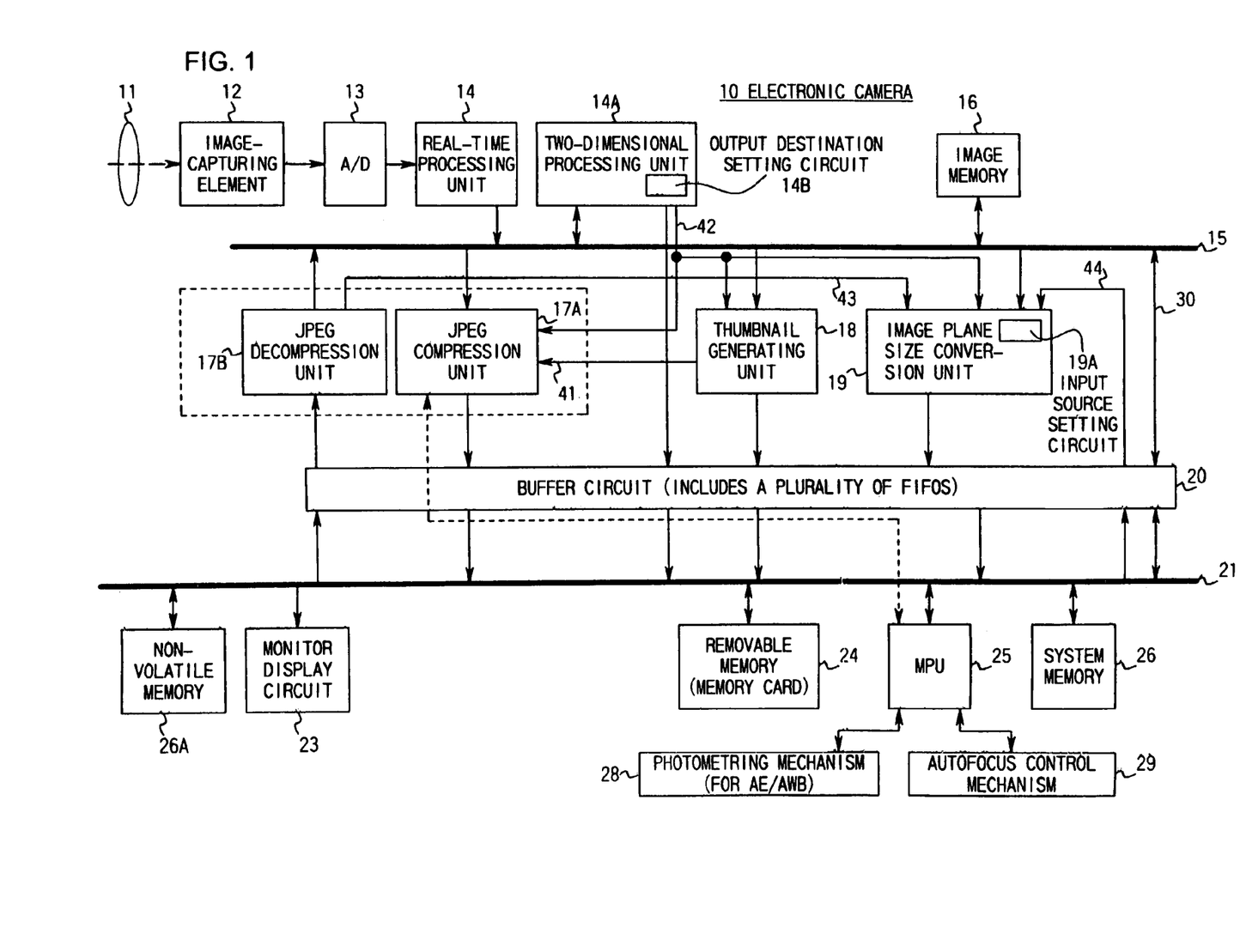
FIG. 1 is a block diagram illustrating the structure of the electronic camera 10.

FIG. 1 is a block diagram illustrating the structure of an electronic camera 10 in the embodiment.

In FIG. 1, a taking lens 11 is mounted at the electronic camera 10. An image-capturing element 12 is provided in the image space of the taking lens 11. An image output of the image-capturing element 12 is input to a real-time processing unit 14 via an A/D conversion circuit 13. An output port of the real-time processing unit 14 is connected to a first bus 15.

A first input/output port of a two-dimensional processing unit 14A, an input/output port of an image memory 16, an input port of a JPEG compression unit 17A, an output port of a JPEG decompression unit 17B, an input port of a thumbnail generating unit 18 and an input port of an image plane size conversion unit 19 are connected to the first bus 15.

In addition, the electronic camera 10 is provided with a second bus 21 which is independent of the first bus 15. A second output port of the two-dimensional processing unit 14A, an output port of the JPEG compression unit 17A, an input port of the JPEG decompression unit 17B, an output port of the thumbnail generating unit 18, an output port of the image plane size conversion unit 19 and the first bus 15 are connected to the second bus 21 via a buffer circuit 20.

It is to be noted that the buffer circuit 20 in this structure is constituted of a plurality of FIFOs (first-in/first-out memories) and their control circuits, and performs timing adjustment or multiplexing for individual sets of data to ensure that data collisions do not occur on the second bus 21.

In addition, the two-dimensional processing unit 14A is internally provided with an output destination setting circuit 14B that selects the first bus 15 and/or the second bus 21 as an output destination of conversion output.

A monitor display circuit 23, a removable memory 24, an MPU 25, a system memory 26 and a non-volatile memory 26A are also connected to the second bus 21.

A photometering mechanism 28 for AE (automatic exposure) and AWB (automatic white balance adjustment) and an autofocus control mechanism 29 for AF (autofocus control) are connected to the MPU 25.

Furthermore, as illustrated in FIG. 1, a data transfer path 30, through which the MPU 25 inputs/outputs data from/to the image memory 16 is provided.

The following is an explanation of operations performed in the embodiment of the present invention.

(Operation Performed During Image-Capturing in Compression Mode)

Figure 2:
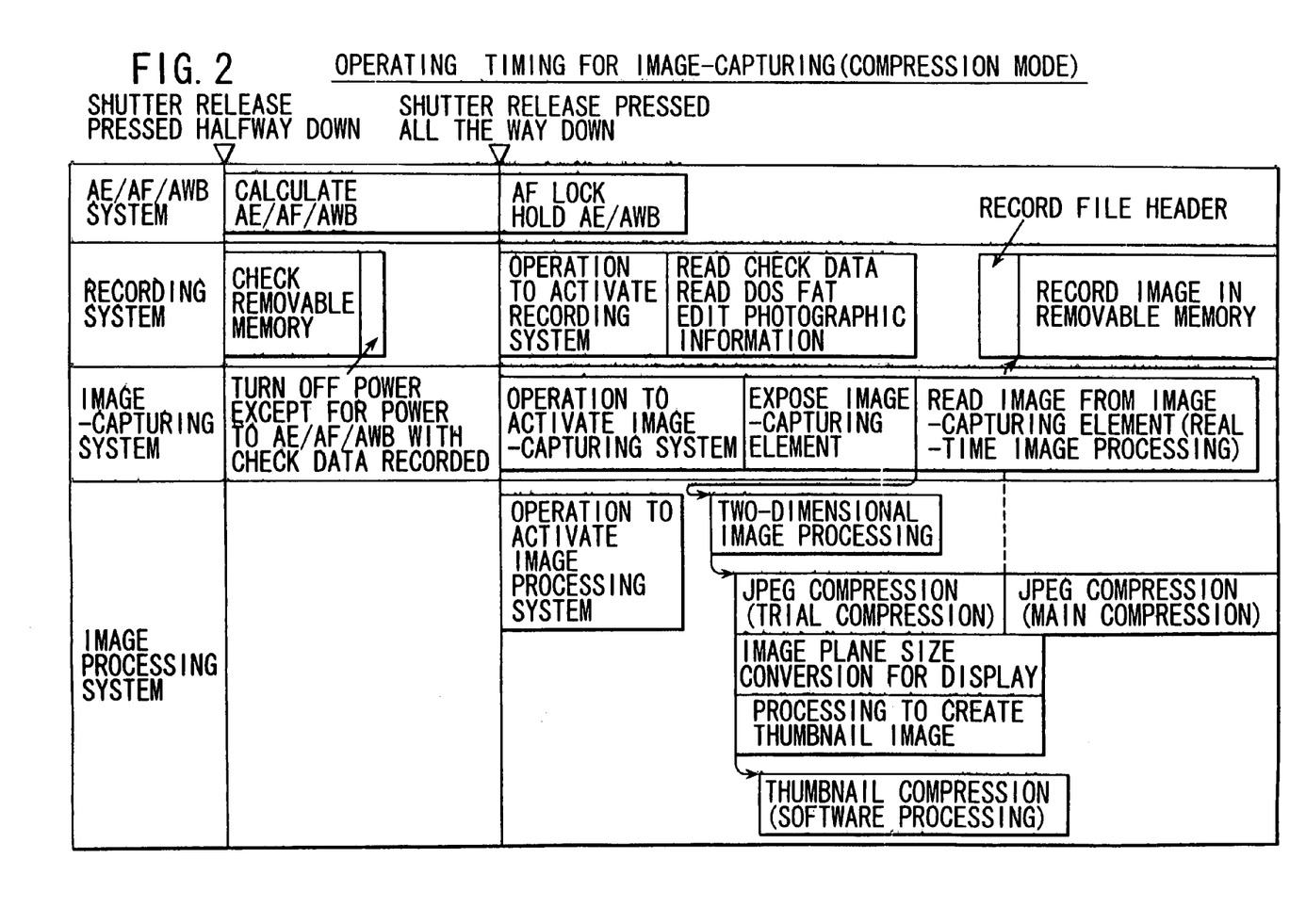
FIG. 2 illustrates the operating timing (compression mode) for an image-capturing operation.

FIG. 2 illustrates the operating timing achieved when compressing and recording image data. The following is an explanation of the operating timing for an image-capturing operation, given in reference to FIG. 2.

1. Pressing the Shutter Release Button Halfway Down

First, when the shutter release button (not shown) of the electronic camera 10 is pressed halfway down, the MPU 25 issues a command for photographing preparation. In response to this command, the photometering mechanism 28 starts a "photometering operation/white balance detection." At the same time, the autofocus control mechanism 29 starts to implement focus control.

In parallel with these operations performed to prepare for a photographing operation, the MPU 25 turns on the power to the recording system (the removable memory 24), and starts to "check the removable memory 24." It is to be noted that at this point, operations such as decision-making as to whether or not the removable memory 24 is present, decision-making as to whether or not the removable memory 24 is usable, collection of attribute information with respect to the removable memory 24, decision-making as to whether or not the removable memory 24 is formatted and initial setting for the driver are executed.

When these checking operations are completed, the MPU 25 first stores the check data in the non-volatile memory 26A and then turns off the power to the recording system.

2. Release Operation (Pressing the Shutter Release Button All the Way Down

When the shutter release button of the electronic camera 10 is pressed all the way down, the MPU 25 issues a command to finalize the photographing preparation. In response to this command, the photometering mechanism 28 "holds the results of exposure calculation performed based upon the photometering value/the results of white balance calculation." In the mean time, the autofocus control mechanism 29 executes an AF lock.

In parallel with these operations to finalize the photographing preparation, the MPU 25 turns on the power to the image-capturing element 12, the removable memory 24 and related circuits (operation to activate the means for image-capturing, operation to activate the means for recording).

It is to be noted that while the electronic camera in the embodiment is provided with a dedicated photometering mechanism 28 and a dedicated autofocus control mechanism 29, there are electronic cameras that execute-AE/AWB/AF operations by using the image-capturing element 12. In such a camera, the image-capturing element and the related circuits are turned on when the shutter release button is pressed halfway down. In this case, the operation to activate the means for image-capturing corresponds to an operation performed to switch from the AE/AWB/AF operations to a still photographing state. During the switching operation, the read mode for the image-capturing element 12 is reset, the mechanical shutter is closed (if the camera is provided with a mechanical shutter) and unnecessary electrical charges are cleared from the image-capturing element 12 and so forth.

3. Exposure Operation at the Image-Capturing Element 12

When the operation to activate the means for image-capturing is completed, the image-capturing element 12 starts an exposure operation.

In parallel with the exposure operation, the MPU 25 sequentially executes the following operations.

The check data obtained by checking the removable memory 24 are retrieved from the non-volatile memory 26A.

Information such as the photographing date is obtained from the internal timer and is edited as photographic information (operation to edit photographic information). The photographic information resulting from the editing operation is temporarily recorded in the system memory 26.

A FAT (file allocation table) is read out from the removable memory 24 and placed on the system memory 26 (operation to prepare for data recording in the removable memory 24).

It is to be noted that if the exposure time is long and there is some processing idle time, the directory entry and the FAT entry required for recording the photographed image should be detected as well, by referencing the check data.

4. Image Data Scan/Read Operation and Two-Dimensional Image Processing

When a specific length of exposure time elapses, image data (CCD raw data) are sequentially read out from the image-capturing element 12. After undergoing A/D conversion, the image data are sequentially output to the real-time processing unit 14. The real-time processing unit 14 performs real-time processing such as defective pixel correction, black level clamping, white balance adjustment and gamma correction on the image data and sequentially records the processed image data in the image memory 16 via the first bus 15.

Figure 3A:
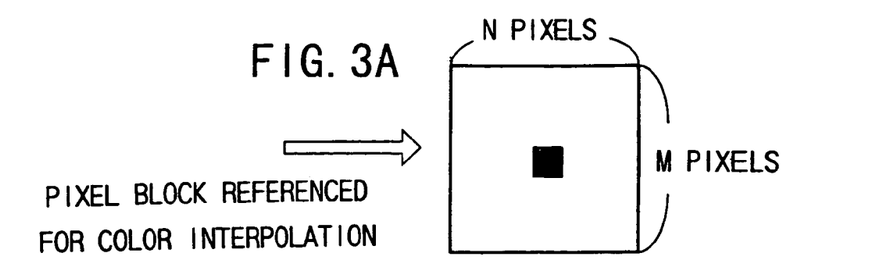
FIGS. 3A~3E each illustrate an image processing unit block.

In order to perform two-dimensional image processing in units of (N×M) pixels, the two-dimensional processing unit 14A starts two-dimensional image processing (such as color interpolation processing) in parallel at the point in time at which image data corresponding to M lines have been accumulated in the image memory 16 (see FIG. 3A).

It is to be noted that if a line memory corresponding to M lines is provided inside the two-dimensional processing unit 14A, the output from the real-time processing unit 14 can be directly provided to the two-dimensional processing unit 14A without temporarily recording it in the image memory 16. However, since the capacity of such a line memory must increase if the number of pixels at the image-capturing element 12 is large or the block size (N×M) is large, it is often difficult to provide the line memory inside the two-dimensional processing unit 14A. In addition, since other processing units cannot access the line memory, it becomes necessary to provide a dedicated line memory at each processing unit. This tends to lead to problems such as an increase in power consumption and the structures of the individual processing units becoming more complicated.

The embodiment, in which the problems described above are eliminated by making the plurality of processing units share the image memory (it is particularly desirable to employ a highspeed memory), achieves a structure that enables parallel execution of a plurality of types of processing in a flexible manner.

It is to be noted that the output destination setting circuit 14B sets the first bus 15 as the destination of the output from the two-dimensional processing unit 14A in the compression mode. Thus, image data having been processed at the two-dimensional processing unit 14A are sequentially output to the first bus 15 and sequentially recorded in the image memory 16.

5. JPEG Compression Processing

Next, the JPEG compression unit 17A starts a trial compression on the image data having undergone the two-dimensional image processing.

Figure 3B:
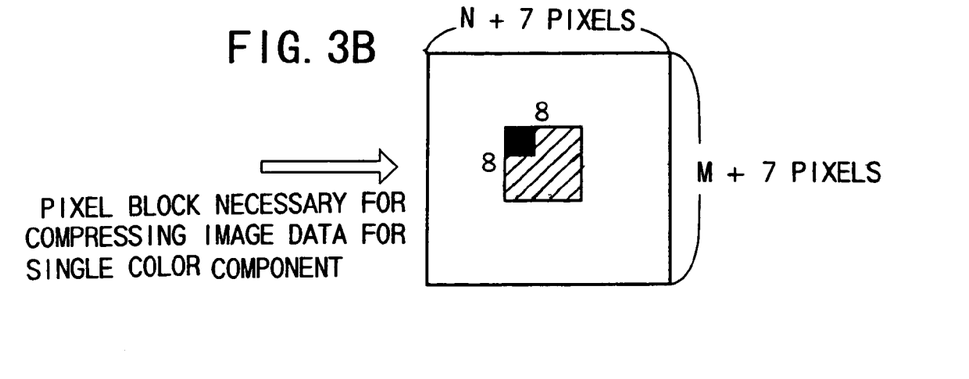

In JPEG compression processing, an image compression calculation is executed on the individual color components (e.g., a Y Cb Cr color image) in units of 8×8 pixels block. Thus, the JPEG compression unit 17A starts the trial compression in parallel at a point in time at which an 8×8 pixels block is output from the two-dimensional processing unit 14A. Since the two-dimensional processing unit 14A prepares a single 8×8 pixels block for each color component based upon image data corresponding to (N+7)×(M+7) pixels, parallel execution of the image processing by the two-dimensional processing unit 14A and the trial compression proceeds from this time point (see FIG. 3B).

Figure 3C:
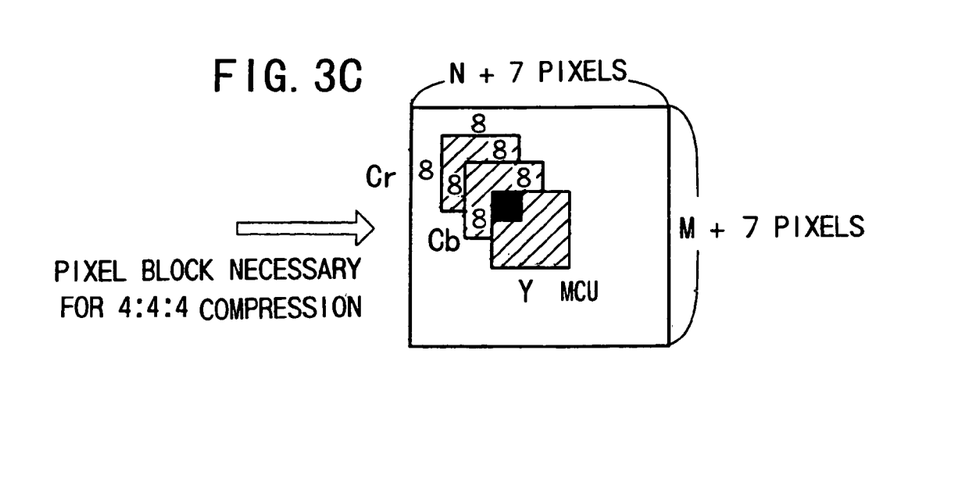

For instance, when processing a 4:4:4 color image, the image compression calculation is executed by handling 8×8 pixels blocks, each block corresponding to one of the three colors, i.e., Y, Cb and Cr, as one unit. Thus, the JPEG compression unit 17A starts the execution of trial compression in parallel when the three 8×8 pixels blocks have been output from the two-dimensional processing unit 14A. In other words, parallel execution of the image processing by the two-dimensional processing unit 14A and the trial compression proceeds from the time point at which the two-dimensional processing unit 14A has created the three 8×8 pixels blocks (one each of Y, Cb and Cr) based upon the image data corresponding to (N+7)×(M+7) pixels (see FIG. 3C).

Figure 3D:
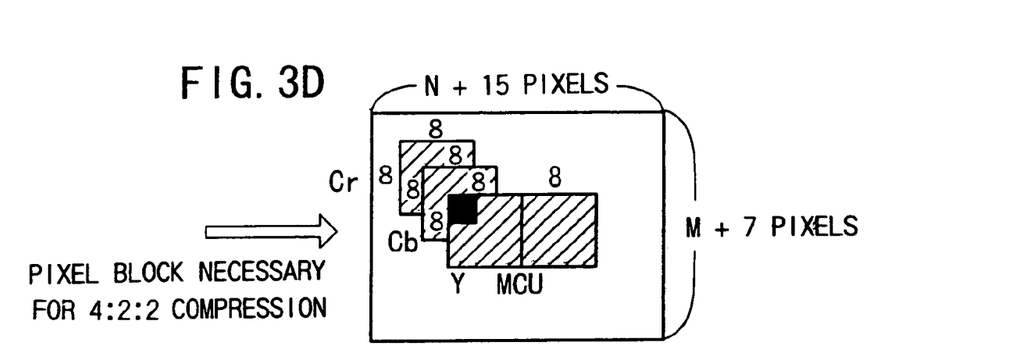

In addition, when processing a 4:2:2 color image, the image compression calculation is executed by handling two 8×8 pixels blocks corresponding to the Y component and one each of 8×8 pixels blocks corresponding to the Cb and Cr components as one unit. Thus, the JPEG compression unit 17A starts the execution of trial compression in parallel when the four 8×8 pixels blocks (two 8×8 pixels blocks corresponding to the Y component, and one each of 8×8 pixels blocks corresponding to the Cb and Cr components) have been output from the two-dimensional processing unit 14A. In other words, parallel execution of the image processing by the two-dimensional processing unit 14A and the trial compression proceeds from the time point at which the two-dimensional processing unit 14A has created the four 8×8 pixels blocks (two 8×8 pixels blocks corresponding to the Y component, and one each of 8×8 pixels blocks corresponding to the Cb and Ct, components) based upon the image data corresponding to (N+15)×(M+7) pixels (see FIG. 3D)

Figure 3E:
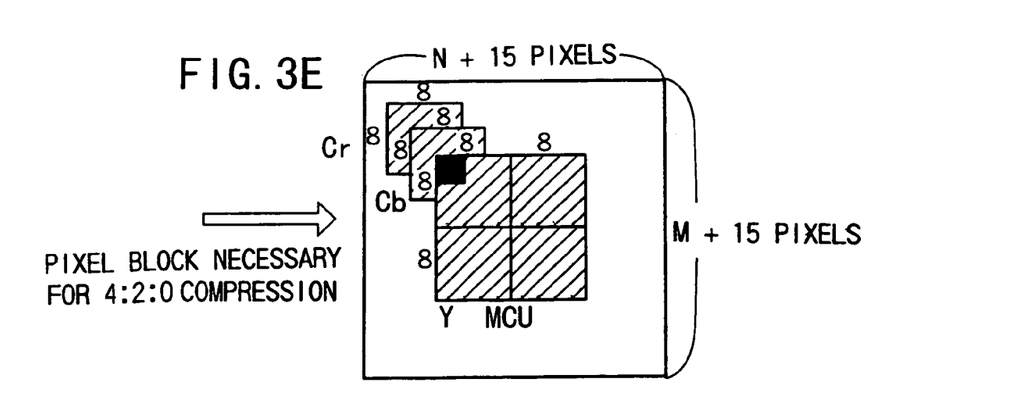

When processing a 4:2:0 color image, the image compression calculation is executed by handling four 8×8 pixels blocks corresponding to the Y component and one each of 8×8 pixels blocks corresponding to the Cb and Cr components as one unit. Thus, the JPEG compression unit 17A starts the execution of trial compression in parallel when the six 8×8 pixels blocks (four 8×8 pixels blocks corresponding to the Y component, and one each of 8×8 pixels blocks corresponding to the Cb and Cr components) have been output from the two-dimensional processing unit 14A. In other words, parallel execution of the image processing by the two-dimensional processing unit 14A and the trial compression proceeds from the time point at which the two-dimensional processing unit 14A has created the six 8×8 pixels blocks based upon the image data corresponding to (N+15)×(M+15) pixels (see FIG. 3E).

It is to be noted that in the trial compression described above, the JPEG compression unit 17A does not output compressed data and instead notifies the MPU 25 of only the code volume of the compressed data. For this reason, during this trial compression period, the efficiency of utilization of the second bus 21 by the JPEG compression unit 17A becomes extremely low. Thus, in order to utilize the second bus 21 efficiently during the trial compression period, the following processing (processing 6~7 below) is executed in parallel.

6. Image Plane Size Conversion for Display

When a sufficient volume of pixel blocks required for image plane size conversion are accumulated in the image memory 16 by the two-dimensional processing unit 14A, the image plane size conversion unit 19 sequentially takes in the image data via the first bus 15 and executes image plane size conversion for display. As a result, the image processing by the two-dimensional processing unit 14A and the image plane size conversion processing proceed in parallel.

The image plane size conversion unit 19 sequentially outputs the display image data prepared in this manner to the buffer circuit 20.

7. Thumbnail Generation Processing

When a sufficient volume of pixel blocks required for thumbnail generation are accumulated in the image memory 16 by the two-dimensional processing unit 14A, the thumbnail generating unit 18 sequentially takes in the image data via the first bus 15 and executes thumbnail generation processing. As a result, the image processing by the two-dimensional processing unit 14A and the thumbnail generation processing (a type of image plane size conversion) proceed in parallel.

The thumbnail generating unit 18 sequentially outputs the thumbnail image data thus created to the buffer circuit 20.

8. Timing Adjustment by the Buffer Circuit 20

The buffer circuit 20 alternately outputs the display image data and the thumbnail image data onto the second bus 21 to ensure that its internal FIFOs do not overflow. The MPU 25 sequentially records the display image data and the thumbnail image data on the second bus 21 in respective areas on the system memory 26.

The monitor display circuit 23 sequentially reads out the display image data from the system memory 26 and executes monitor display. It is to be noted that if a video memory is provided within the monitor display circuit 23, the display image data may be directly written in the video memory without engaging the system memory 26 (it is to be noted that the structure achieved by providing the monitor display circuit 23 on the side where the first bus 15 is present is described in the summary of the invention).

If a video memory is provided within the monitor display circuit 23, by directly providing an output from the image plane size conversion unit 19 to the monitor display circuit 23, it becomes unnecessary to engage either the first bus 15 or the second bus 21, so that the loads on the buses are further reduced.

9. Thumbnail Compression Processing by the MPU 25

When a sufficient volume of pixel blocks required to perform JPEG compression processing on the thumbnail image data are accumulated in the system memory 26, the MPU 25 sequentially takes in the thumbnail image data from image memory 16 via the second bus 21 and executes compression processing on the thumbnail image data (software processing). As a result, the thumbnail generation processing (a type of image plane size conversion) by the thumbnail generating unit 18 and the thumbnail compression processing by the MPU 25 proceed in parallel.

In this case, the output of the thumbnail image data is completed after the two-dimensional image processing is completed. As a result, the thumbnail image data requiring a relatively small capacity are output onto the second bus slowly. Thus, the image compression calculation can be performed at the MPU 25 side by allowing a sufficient margin in correspondence to the speed at which the thumbnail image data are output so that it becomes possible to complete the thumbnail compression without letting a great length of time elapse after the completion of the processing by the two-dimensional processing unit 14A.

The thumbnail image data that have been compressed in this manner (hereafter referred to as "thumbnail compressed data") are sequentially recorded in the system memory 26.

10. JPEG Compression (Main Compression)

At the time point at which the trial compression ends, the JPEG compression unit 17A notifies the MPU 25 of the compressed code volume. Based upon the compressed code volume, the MPU 25 determines a correct scale factor for achieving a target compression rate and notifies the JPEG compression unit 17A of the determined scale factor.

In conformance to the scale factor, the JPEG compression unit 17A executes JPEG compression (main compression), sequentially outputs the compressed data to the buffer circuit 20 and temporarily records them in the system memory 26. Since the processing 6~9 described above is almost completed at this time point, the buffer circuit 20 can output the compressed data from the JPEG compression unit 17A onto the second bus 21 almost in real time.

11. Recording into the Removable Memory 24

The MPU 25 creates the header portion of an image file by combining the thumbnail compressed data and the photographic information on the system memory 26, and records the header portion thus created in the removable memory 24. Then, the MPU 25 sequentially reads out the compressed data from the system memory 26 via the second bus 21 and sequentially records the compressed data thus read out in the removable memory 24 as the data portion of the image file. At this time, the system memory 26 functions as a buffer memory for the compressed data. The image compression processing by the JPEG compression unit 17A and the recording of the compressed data proceed in parallel in this manner.

It is to be noted that the MPU 25 may sequentially record compressed data output onto the second bus 21 in the removable memory 24 without engaging the system memory 26. In such a case, pipeline type parallel processing of the compression operation and the recording operation is implemented.

Through the series of operations described above, compressed image data are recorded in the removable memory 24.

Next, the operation performed when image data are recorded in an uncompressed state is explained.

(Operation Performed During Image-Capturing in the Non-Compression Mode)

Figure 4:
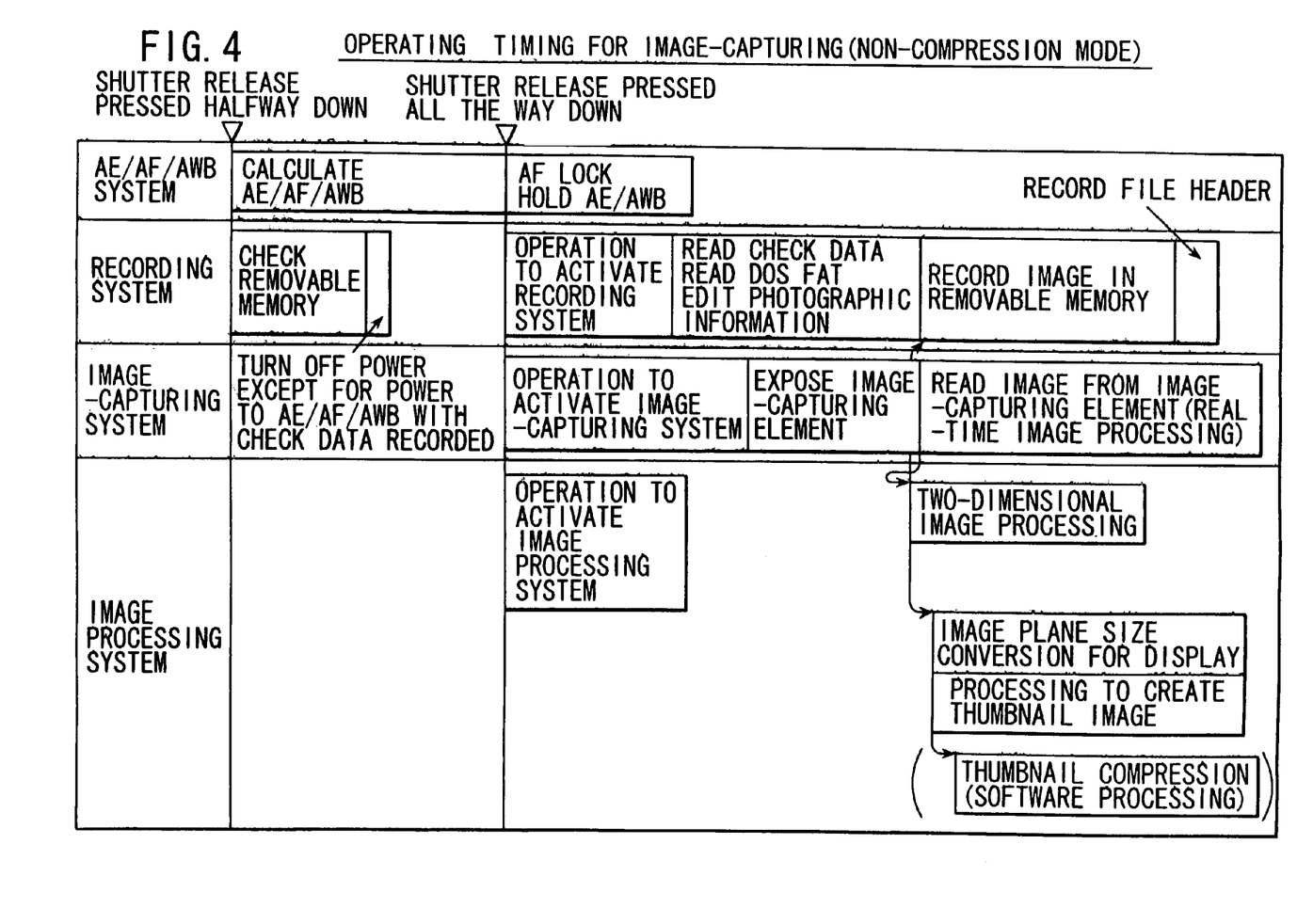
FIG. 4 illustrates the operating timing (non-compression mode) for an image-capturing operation.

FIG. 4 illustrates the operation timing achieved when recording image data in a non-compressed state. The following is an explanation of the features that characterize the operation performed in the non-compression mode.

First, the output destination setting circuit 14B sets both the first bus 15 and the second bus 21 as destinations of an output resulting from conversion processing in the non-compression mode. As a result, image data having undergone the two-dimensional image processing by the two-dimensional processing unit 14A are simultaneously output to the first bus 15 and the second bus 21.

It is to be noted that in this situation, the image data output by the two-dimensional processing unit 14A may be directly provided to the thumbnail generating unit 18 and the image plane size conversion unit 19 via a transmission path 42 shown in FIG. 1 for the execution of thumbnail generation and image plane size conversion.

The image data output to the first bus 15 are taken in by the thumbnail generating unit 18 and the image plane size conversion unit 19, as in the operation in the compression mode explained earlier.

The image data output to the second bus 21, on the other hand, undergo timing adjustment via the buffer circuit 20, are sequentially output to the second bus 21 and are temporarily recorded in the system memory 26. The MPU 25 reads out the uncompressed image data from the system memory 26 and sequentially records them in the removable memory 24 as the data portion of the image file. The image processing by the two-dimensional processing unit 14A and the recording of the uncompressed image data, proceed in parallel in this manner. It is to be noted that if the recording speed at the removable memory 24 is low, idle time is created at the second bus 21. In order to utilize this idle time efficiently, the following processing 1 and 2 is inserted in parallel.

1. The thumbnail image data output by the thumbnail generating unit 18 first undergo timing adjustment via the buffer circuit 20, are sequentially output onto the second bus 21 and are temporarily recorded in the system memory 26.

2. The display image data output by the image plane size conversion unit 19 first undergo timing adjustment via the buffer circuit 20, are sequentially output onto the second bus 21 and are temporarily recorded in the system memory 26. The monitor display circuit 23 reads out the display image data from the system memory 26 and executes monitor display (the display image data may be directly written in the video memory within the monitor display circuit 23 without engaging the system memory 26).

When the recording of the data portion of the image file is completed, the MPU 25 creates the header portion of the image file by combining the thumbnail image (in the non-compression mode, the thumbnail image, too, is often recorded in an uncompressed state) and the photographic information on the system memory 26 and records the header portion thus created in the removable memory 24.

It is to be noted that if the thumbnail image is uncompressed, the file header has a fixed length. Thus, a memory area for the file header may be secured in advance when recording the data portion of the image file earlier.

In addition, if the MPU 25 compresses the thumbnail image, the compression may be executed in parallel with the thumbnail generation processing.

Through the operations described above, recording of uncompressed image data is completed.

Next, the operation performed when reproducing an image is explained.

(Operation During Image Reproduction)

Figure 5:
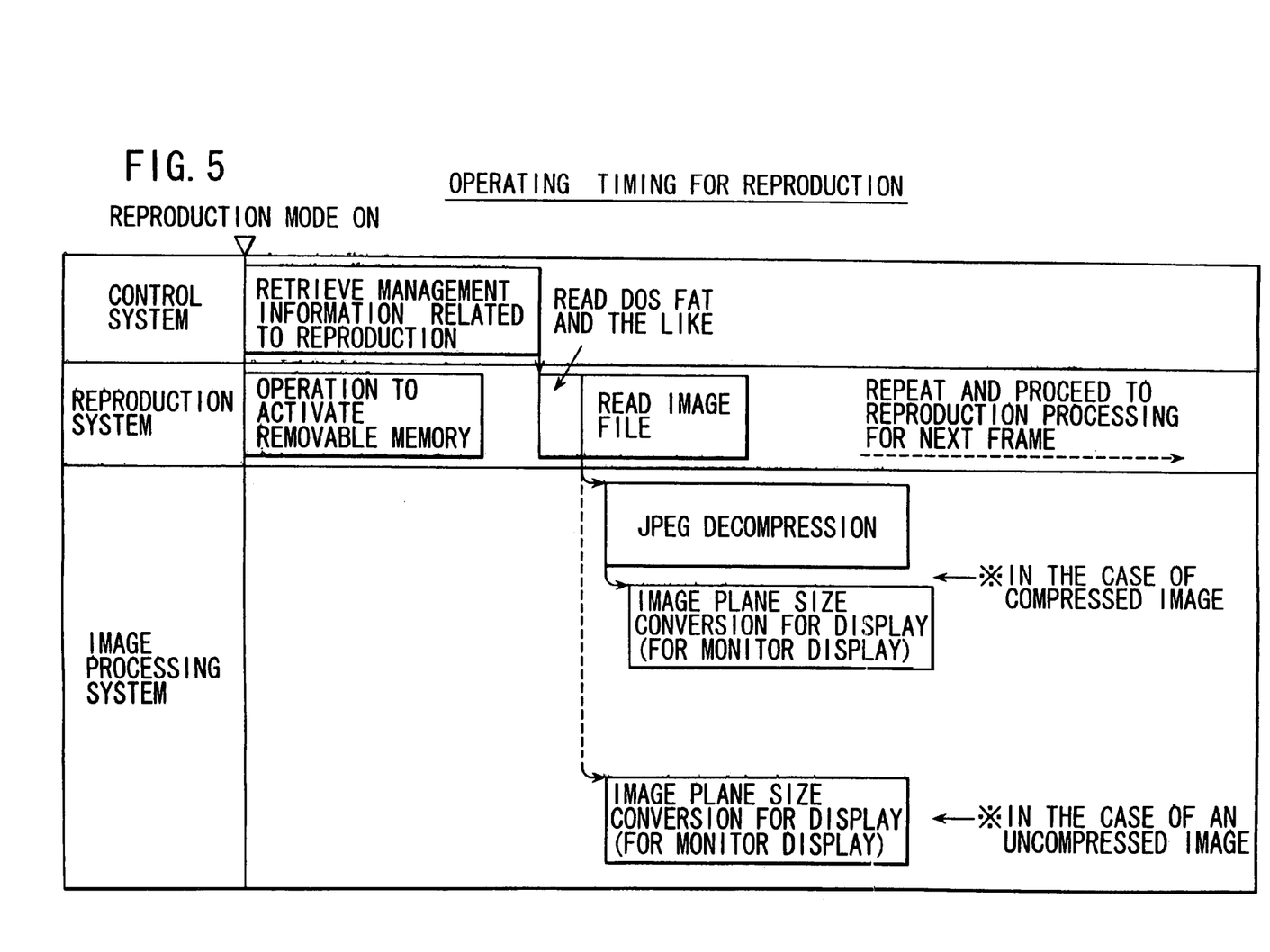
FIG. 5 illustrates the operating timing for an reproduction operation.

FIG. 5 illustrates the operating timing achieved when reproducing image data in the removable memory 24. The following is an explanation of the image reproduction operation given in reference to FIG. 5.

1. "Operation to Activate the Removable Memory 24" and "Retrieve of Management Information"

When the electronic camera 10 is set in the reproduction mode, the MPU 25 turns on power to the removable memory 24 (operation to activate the removable memory 24).

In parallel with this operation, the MPU 25 reads out the check data obtained by checking the removable memory 24 from the non-volatile memory 26A. The check data include information necessary to retrieve management information such as the name of the directory in which the image file to be reproduced first is contained, the name of the image file and information related to the file system which may be DOS FAT or the like. Based upon the check data, the MPU 25 retrieves the management information necessary for the execution of the reproduction operation onto the system memory 26.

The operation to activate the removable memory 24 and the retrieve of the management information proceed in parallel in this manner.

2. "DOS FAT Read," "Compressed Data Read" and "JPEG Decompression Processing"

When the removable memory 24 is started up and a data read is enabled, the FAT and the directory area which is to be reproduced first are read out onto the system memory 26. During this operation, the management information related to the file system retrieved in 1 above is utilized.

The MPU 25 sequentially reads out compressed data from the removable memory 24 onto the second bus 21 and sequentially records them in the system memory 26. The JPEG decompression unit 17B sequentially takes in the compressed data from the system memory 26 via the buffer circuit 20 and sequentially executes JPEG decompression processing.

"Compressed data read" and "compressed data decompression conversion" proceed in parallel in this manner.

It is to be noted that the MPU 25 may send the compressed data on the second bus 21 to the buffer circuit 20 without engaging the system memory 26. In this case, the JPEG decompression unit 17B receives the compressed data without engaging the system memory 26, and pipeline type parallel processing of the "compressed data read processing" and the "JPEG decompression processing" is executed.

3. Image Plane Size Conversion for Display

The image data that have been decompressed by the JPEG decompression unit 17B are sequentially output to the first bus 15 and are temporarily recorded in the image memory 16. The image plane size conversion unit 19 converts the image plane size of the image data by sequentially taking in the image data from image memory 16 to generate display image data. The display image data are sequentially output onto the second bus 21 via the buffer circuit 20 and are sequentially recorded in the system memory 26. The monitor display circuit 23 reads out the display image data from the system memory 26 and executes monitor display. It is to be noted that this operation may be performed by employing the video memory within the monitor display circuit 23, and in such a case, since the band of the second bus 21 is not used unnecessarily, the efficiency of the processing performed using the second bus 21 is further improved.

"Compressed data decompression conversion" and "image plane size conversion" proceed in parallel in this manner.

4. Operation to Reproduce an Uncompressed Image

If the image data read out from the removable memory 24 are in an uncompressed state, the image data are sequentially passed through the second bus 21, the buffer circuit 20 and the first bus 15 and are finally taken in by the image plane size conversion unit 19. The image plane size conversion unit 19 converts the image plane size of the image data and creates display image data. The display image data are written in the video memory within the monitor display circuit 23 or the system memory 26 via the buffer circuit 20 and are displayed at the monitor.

"Image read" and "image plane size conversion" proceed in parallel in this manner.

Advantages of the Embodiment

In the embodiment, the first bus 15 and the second bus 21 are separated from each other with a high degree of reliability. Consequently, data collisions on the buses are effectively prevented, while enabling smooth execution of a plurality of types of image conversion processing. In addition, as explained in reference to FIGS. 2, 4 and 5, parallel execution of processing in various operations is enabled in the embodiment. Furthermore, by using the buffer circuit 20, data collisions are effectively prevented from occurring within the electronic camera 10. Moreover, as explained earlier, the software processing by the MPU 25 and the hardware processing performed by the JPEG compression unit 17A, the thumbnail generating unit 18, the image plane size conversion unit 19 and the JPEG decompression unit 17B are executed in concert with each other in an effective manner.

Through the synergistic effect achieved by the combination of the above, the embodiment achieves a great reduction in processing time in the electronic camera 10.

Complementary Notes on the Embodiment

It is to be noted that a means for transmission may be provided among the means for image data conversion. For instance, as illustrated in FIG. 1, the transmission path 42 for transmitting 8×8 pixels blocks may be provided between the two-dimensional processing unit 14A and the JPEG compression unit 17A. In an electronic camera structured as described above, it becomes possible for the JPEG compression unit 17A to execute compression processing by directly taking in 8×8 pixels blocks via the transmission path 42. In this case, since no 8×8 pixels block data flow on the first bus 15, the first bus 15 can be utilized efficiently for other processing.

In addition, by providing the transmission path 42 to directly transmit the output from the two-dimensional processing unit 14A to the thumbnail generating unit 18 and the image plane size conversion unit 19, availability of the first bus 15 can be assured in an efficient manner.

It is to be noted that if the thumbnail compression is achieved through hardware, a transmission path 41 for directly transmitting a thumbnail image from the thumbnail generating unit 18 to the JPEG compression unit 17A, as illustrated in FIG. 1, may be provided.

Furthermore, a transmission path 43 for directly transmitting decompressed image data from the JPEG decompression unit 17B to the image plane size conversion unit 19 may be provided, as illustrated in FIG. 1. In this case, it becomes possible to assure availability of the first bus 15 in the reproduction mode in an efficient manner.

Moreover, by providing an output destination setting circuit at both the JPEG compression unit 17A and the thumbnail generating unit 18, compressed data and thumbnail compressed data (or thumbnail image data) can be returned to the first bus side and then recorded in the image memory 16, which, in turn, makes it possible to increase the number of frames over which photographing is enabled in highspeed continuous shooting.

It is to be noted that a means for input source setting may be provided at a means for image data conversion. For instance, as illustrated in FIG. 1, an input source setting circuit 19A may be provided at the image plane size conversion unit 19. By adopting this structure, image data in an uncompressed state read out from the removable memory can be directly provided to the image plane size conversion unit 19 sequentially via the second bus 21 and a transmission path 44. In this situation, the image data having undergone size conversion at the image plane size conversion unit 19 then undergo timing adjustment at the buffer circuit 20, are returned to the second bus 21 and are finally provided to the monitor display circuit 23.

In addition, an output destination setting circuit may be added at the image plane size conversion unit 19 structured as described above. In such a case, the destination of an output from the image plane size conversion unit 19 can be temporarily switched to image memory 16 on the side where the first bus 15 is present to avoid an overflow at the buffer circuit 20 when, for instance, the load on the second bus 21 has increased excessively (e.g., when a reproduction frame feed has been repeatedly performed).

Furthermore, while the explanation is given in reference to the embodiment on an example in which the first bus 15 is directly connected to the plurality of means for image data conversion (14A, 17A, 18 and 19), the present invention is not limited to this example. Input buffers such as line memories may be individually provided between the first bus 15 and the plurality of means for image data conversion (14A, 17A, 18 and 19). Since the image output from the real-time processing unit 14 can be directly taken into the individual input buffers by adopting such a structure, the image memory 16 is accessed less frequently so that the length of processing time is further reduced.

What is claimed is:

1. An electronic camera comprising:
    an image-capturing device that captures an image of a subject and generates image data;
    an image processing device that performs two-dimensional image processing on the image data generated by the image-capturing device; and
    a size conversion device that performs an image plane size conversion to convert an image plane size of the image data having undergone the two-dimensional image processing at the image processing device and being output from the image processing device, wherein:
    processing time during an image-capturing stage in the electronic camera is reduced by implementing in parallel the two-dimensional image processing performed by the image processing device and the image plane size conversion performed by the size conversion device.

2. An electronic camera according to claim 1, further comprising:
    a compression device that performs image compression processing on the image data having undergone the image plane size conversion performed by the size conversion device and being output from the size conversion device, wherein:
    processing time during an image-capturing stage in the electronic camera is reduced by implementing in parallel the image plane size conversion performed by the size conversion device and the image compression processing performed by the compression device.

3. An electronic camera according to claim 1, wherein when the image processing device has performed the two-dimensional image processing on a part of the image data, the size conversion device starts the image plane size conversion on the image data having undergone the two-dimensional image processing at the image processing device and being output from the image processing device.

4. An electronic camera according to claim 1, further comprising:
    a compression conversion device that performs image compression on the image data having undergone two-dimensional image processing at the image processing device and being output from the image processing device, wherein:
    processing time during an image-capturing stage in the electronic camera is reduced by implementing in parallel the two-dimensional image processing performed by the image processing device, the image plane size conversion performed by the size conversion device, and the image compression performed by the compression conversion device.

5. An electronic camera according to claim 4, wherein when the image processing device has performed the two-dimensional image processing on a part of the image data, the compression conversion device starts the image compression on the image data having undergone the two-dimensional image processing at the image processing device and being output from the image processing device.

6. An electronic camera according to claim 2, wherein:
    the image data having undergone the image plane size conversion performed by the size conversion device is a thumbnail image; and
    the compression device performs the image compression processing on the thumbnail image.

7. An electronic camera according to claim 1, wherein the size conversion device converts an image plane size of the image data having undergone the two-dimensional image processing at the image processing device to an image plane size for monitor display.

8. An electronic camera according to claim 1, wherein the size conversion device converts the image data having undergone the two-dimensional image processing at the image processing device to a thumbnail image.

* * * * *